(12) United States Patent
Cao et al.

(10) Patent No.: US 11,790,142 B2
(45) Date of Patent: Oct. 17, 2023

(54) FLEXIBLE MODELING METHOD FOR TIMING CONSTRAINT OF REGISTER

(71) Applicant: SOUTHEAST UNIVERSITY, Jiangsu (CN)

(72) Inventors: Peng Cao, Jiangsu (CN); Haiyang Jiang, Jiangsu (CN); Jiahao Wang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 18/014,002

(22) PCT Filed: Mar. 9, 2022

(86) PCT No.: PCT/CN2022/079941
§ 371 (c)(1),
(2) Date: Dec. 30, 2022

(87) PCT Pub. No.: WO2023/000684
PCT Pub. Date: Jan. 26, 2023

(65) Prior Publication Data
US 2023/0195985 A1 Jun. 22, 2023

(30) Foreign Application Priority Data
Jul. 23, 2021 (CN) .......................... 202110835923.9

(51) Int. Cl.
*G06F 30/3312* (2020.01)
*G06F 30/3315* (2020.01)
*G06F 119/12* (2020.01)

(52) U.S. Cl.
CPC ...... *G06F 30/3312* (2020.01); *G06F 30/3315* (2020.01); *G06F 2119/12* (2020.01)

(58) Field of Classification Search
CPC ............. G06F 30/3312; G06F 30/3315; G06F 2119/12
See application file for complete search history.

(56) References Cited

FOREIGN PATENT DOCUMENTS

CN 1985257 A 6/2007
CN 105138774 A 12/2015
(Continued)

OTHER PUBLICATIONS

Cao, Peng et al., "An Accurate and Efficient Timing Prediction Framework for Wide Supply Voltage Design Based on Learning Method," Electronics, 9:580, 13 pages, Mar. 30, 2020.
(Continued)

*Primary Examiner* — Jack Chiang
*Assistant Examiner* — Aric Lin
(74) *Attorney, Agent, or Firm* — MUNCY, GEISSLER, OLDS & LOWE, P.C.

(57) ABSTRACT

Disclosed in the present invention is a flexible modeling method for a timing constraint of a register. Simulation ranges of input terminal transition time, clock terminal transition time, and output load capacitance of a register are determined first, simulation is performed under each combination of input terminal transition time, clock terminal transition time, and output load capacitance to obtain a timing constraint range, then setup slack and hold slack are extracted in this constraint range with a particular interval, and then simulation is performed to obtain a clock terminal-to-output terminal delay. Finally, a mutually independent timing model of the register is established by using an artificial neural network, where the clock terminal-to-output terminal delay is modeled as a function of the input terminal transition time, the clock terminal transition time, the output load capacitance, the setup slack, the hold slack, and an output terminal state. A flexible timing constraint model in (Continued)

the present invention has advantages of low simulation overheads and high prediction precision, and is of great significance for static timing analysis timing signoff of a digital integrated circuit.

6 Claims, 3 Drawing Sheets

(56) References Cited

FOREIGN PATENT DOCUMENTS

| | | |
|---|---|---|
| CN | 109255160 A | 1/2019 |
| CN | 109446673 A | 3/2019 |
| CN | 112464599 A | 3/2021 |
| CN | 113626994 A | 11/2021 |

OTHER PUBLICATIONS

Gao, Jingjing et al., "Novel Prediction Framework for Path Delay Variation Based on Learning Method," Electronics, 9:157, 11 pages, Jan. 15, 2020.

FLEXIBLE MODELING METHOD FOR TIMING CONSTRAINT OF REGISTER

TECHNICAL FIELD

The present invention belongs to the field of electronic design automation, and in particular, to a flexible modeling method for a timing constraint of a register.

BACKGROUND

In static timing analysis (STA), setup and hold synchronous timing check is essential for verifying whether timing of a register-based Sequential circuit is correct. A setup time (setup time) of a register is a time within which a data input (D) needs to be valid before a clock toggle (a toggle of 0→1 of the register is triggered for positive edge), and a hold time (hold time) of the register is a time within which the data input still needs to be valid after a clock edge. Data at an input terminal (D) is copied to an output terminal (Q) only when the setup time and the hold time both satisfy requirements. If either one of the two constraints is disobeyed, it is determined that the register operates abnormally, and a timing violation is reported.

In conventional static timing analysis (STA), it is assumed that a register operates in a region (that is, a stable region) with a constant register delay, that is, a clock terminal-to-output terminal delay $T_{cq}$. An assumed operating point of the register is obtained when the setup slack or the hold slack is sufficiently large. In this case, a corresponding clock terminal-to-output terminal delay is minimum $T_{cq}$ of the register when the setup slack and the hold slack are changed, and is denoted as $T_{cq}^{min}$. In addition, when the hold slack is set to a sufficiently large value, the setup slack is gradually reduced. Generally, the setup slack when $T_{cq}$ just reaches $110\% \times T_{cq}^{min}$ is set as the setup time. Similarly, when the setup slack is set to a sufficiently large value, the hold slack is gradually reduced. Generally, the hold slack when $T_{cq}$ just reaches $110\% \times T_{cq}^{min}$ is set as the hold time. In such simplification, a feasible region other than the setup time and the hold time, a mutually independent relationship between the setup slack, the hold slack, and the register delay is omitted. Therefore, circuit performance may be underestimated.

In addition, in a region in which the setup slack is greater than the setup time and the hold slack is greater than the hold time, there is a region in which $T_{cq}$ is greater than $110\% \times T_{cq}^{min}$. However, in conventional STA, it is still assumed that the register delay is $110\% \times T_{cq}^{min}$, causing a risk that the circuit still cannot operate normally even if a timing constraint is satisfied.

In fact, there is a mutually independent relationship between the setup slack, the hold slack, and the register delay of the register. As shown in FIG. 1, when the setup slack and the hold slack are sufficiently large, the clock terminal-to-output terminal delay of the register is a minimum delay of the register. If the setup slack and the hold slack become sufficiently short, the register delay increases until the register enters a metastable region. If the register is allowed to operate in the region in which the setup slack is less than the setup time, a clock cycle of a critical path of a circuit may be shorter. Even if this level of register has relatively small setup slack, the delay of this level of register increases, but the increased delay time only affects a combinational path between the level of register and a next level of register. If the combinational path delay is not large, a timing violation does not occur.

SUMMARY

An objective of the present invention is to provide a flexible modeling method for a timing constraint of a register, to resolve the technical problem that circuit performance is underestimated due to the omission of correlation between setup slack, hold slack, and a clock terminal-to-output terminal delay of a register in a conventional static timing analysis method and the technical problem of reducing simulation overheads required for establishing a flexible model.

To solve the foregoing technical problem, a specific technical solution of the present invention is as follows:

A flexible modeling method for a timing constraint of a register includes the following steps:

step 1. performing simulation in a case of each combination of $S_Q$, $T_{di}$, $T_{ckj}$, and $C_{Lk}$ respectively to obtain a timing constraint range for establishing a model, where $S_Q$ represents an output terminal state of a register; $T_{di}$ represents p types of input terminal transition time $T_d$ of the register, i is an integer, and $1 \leq i \leq p$; $T_{ckj}$ represents q types of clock terminal transition time $T_{ck}$ of the register, j is an integer, and $1 \leq j \leq q$; and $C_{Lk}$ represents m types of output load capacitance $C_L$ of the register, k is an integer, and $1 \leq k \leq m$;

step 2. under the obtained timing constraint range under each combination of $S_Q$, $T_{di}$, $T_{ckj}$, and $C_{Lk}$, setting that $T_{step}$ is a sampling interval of both setup slack and hold slack, extracting N combination pairs of setup slack and hold slack with the set $T_{step}$ as intervals for both setup slack and hold slack, performing simulation by using a transistor-level simulation tool to respectively obtain N clock terminal-to-output terminal delays of the register, and subsequently combining all simulation data under all combinations of $S_Q$, $T_{di}$, $T_{ckj}$, and $C_{Lk}$ together to obtain $N_s$ groups of model training sample data, where each group of training sample data includes parameters including the input terminal transition time, the clock terminal transition time, the output load capacitance, the setup slack, the hold slack, the output terminal state, and the clock terminal-to-output terminal delay of the register;

step 3. using the input terminal transition time, the clock terminal transition time, the output load capacitance, the setup slack, the hold slack, and the output terminal state of the register as model features, using the corresponding clock terminal-to-output terminal delays of the register obtained in step 2 as model labels, performing training by using a neural network, and establishing a mutually independent timing model of the register; and step 4. obtaining timing constraints by using a static timing analysis tool, the timing constraints including the output terminal state, the input terminal transition time, the clock terminal transition time, and the output load capacitance of the register, and performing inference by using the mutually independent timing model of the register obtained in step 3 to obtain a clock terminal-to-output terminal delay of the register when the setup slack is $T_{su}^{\ t}$ and a clock terminal-to-output terminal delay of the register when the hold slack is $T_{hd}^{\ t}$.

Further, step 1 specifically includes the following steps:

step 1.1. under each combination of $S_Q$, $T_{di}$, $T_{ckj}$, and $C_{Lk}$, performing simulation by using the transistor-level simulation tool first to obtain clock terminal-to-output terminal delays $T_{cq}$ when the setup slack has a sufficiently large value $T_{su}(max)$ and the hold slack has a sufficiently large value $T_{hd}$(max), where the sufficiently large value of the setup slack refers to that in this case, if $T_{su}$ continues to increase, $T_{cq}$ no longer continues to decrease, and the sufficiently large value of the hold slack refers to that in this case, if $T_{hd}$ continues to increase, $T_{cq}$ no longer continues to decrease, specifically, when the setup slack increases from $T_{su}$(max) to $\delta_{su} \times T_{su}$(max) and the hold slack increases from $T_{hd}$(max) to $\delta_{hd} \times T_{hd}$(max). $T_{cq}$ remains unchanged, where $\delta_{su}$ is a setup slack verification coefficient, $1 \leq \delta_{su} \leq 1.1$, $\delta_{hd}$ is a hold slack verification coefficient, $1 \leq \delta_{hd} \leq 1.1$, and in this case, the register operates in a stable region, and it is denoted in this case that $T_{cq}$ is $T_{cq}^{min}$, the hold slack is $T_{hd}^A$, and the setup slack is $T_{su}^A$;

step 1.2. gradually reducing the setup slack with $T_{hd}^A$ as a fixed hold slack, where setup slack obtained when transistor-level simulation fails is minimum setup slack in the timing constraint range, and it is denoted in this case that the setup slack is $T_{su}^C$;

step 1.3. searching for the value of the setup slack by using a binary method with $T_{hd}^A$ as a fixed hold slack, where an interval in which the search is started is $[T_{su}^C, T_{su}^A]$, performing simulation on the specific setup slack by using the transistor-level simulation tool to obtain $T_{cq}$, and setting a target value of $T_{cq}$ to $B_{cq} \times T_{cq}^{min}$, where $B_{cq}$ is a first target coefficient of the setup slack, $1 \leq B_{cq} \leq 1.1$, and the value of the setup slack found through binary search is denoted as $T_{su}^B$;

step 1.4. gradually reducing the hold slack with $T_{su}^A$ as a fixed setup slack, where hold slack obtained when transistor-level simulation fails is minimum hold slack in the timing constraint range, and it is recorded in this case that the hold slack is $T_{hd}^G$;

step 1.5. searching for the value of the hold slack by using a binary method with $T_{su}^A$ as a fixed setup slack, where an interval in which the search is started is $[T_{hd}^G, T_{hd}^A]$, performing simulation on the specific hold slack by using the transistor-level simulation tool to obtain the clock terminal-to-output terminal delay $T_{cq}$, and setting a target value of the clock terminal-to-output terminal delay $T_{cq}$ to $F_{cq} \times T_{cq}^{min}$, where $F_{cq}$ is a first target coefficient of the hold slack, $1 \leq F_{cq} \leq 1.1$, and the value of the hold slack found through binary search is denoted as $T_{hd}^F$; and step 1.6. searching for the value of the hold slack by using a binary method with $T_{su}^B$ as a fixed setup slack, where an interval in which the search is started is $[T_{hd}^F, T_{hd}^A]$, performing simulation on the specific hold slack by using the transistor-level simulation tool to obtain the clock terminal-to-output terminal delay $T_{cq}$, and setting the target value of the clock terminal-to-output terminal delay $T_{cq}$ to $D_{cq} \times T_{cq}^{min}$, where $D_{cq}$ is a second target coefficient of the hold slack, $B_{cq} \leq D_{cq} \leq 1.1$, and the value of the hold slack found through binary search is denoted as $T_{hd}^D$;

step 1.7. searching for the value of the setup slack by using a binary method with $T_{hd}^F$ as a fixed hold slack, where an interval in which the search is started is $[T_{su}^B, T_{su}^A]$, performing simulation on the specific setup slack by using the transistor-level simulation tool to obtain the clock terminal-to-output terminal delay $T_{cq}$, and setting the target value of the clock terminal-to-output terminal delay $T_{cq}$ to $H_{cq} \times T_{cq}^{min}$, where $H_{cq}$ is a second target coefficient of the setup slack, $F_{cq} \leq H_{cq} \leq 1.1$, and the value of the setup slack found through binary search is denoted as $T_{su}^H$;

step 1.8. forming a constraint condition by using the following formulas for a simulation range of the pair of the hold slack $T_{hd}$ and the setup slack $T_{su}$ under the combination of $S_Q$, $T_{di}$, $T_{ckj}$, and $C_{Lk}$:

$$\begin{cases} T_{hd}^G \leq T_{hd} \leq T_{hd}^D \\ T_{su}^C \leq T_{su} \leq T_{su}^H \\ \dfrac{T_{su} - T_{su}^H}{T_{su}^B - T_{su}^H} \leq \dfrac{T_{hd} - T_{hd}^F}{T_{hd}^D - T_{hd}^F}, \\ \dfrac{T_{hd} - T_{hd}^G}{T_{hd}^F - T_{hd}^G} \leq \dfrac{T_{su} - T_{su}^B}{T_{su}^C - T_{su}^B} \end{cases} \quad (1)$$

the foregoing formula is the timing constraint range of the model established in a case of the combination of $S_Q$, $T_{di}$, $T_{ckj}$, and $C_{Lk}$.

Further, step 2 specifically includes the following steps:

step 2.1. setting that $T_{step}$ is the sampling interval of both setup slack and hold slack, extracting the N combination pairs of setup slack and hold slack with the set $T_{step}$ as intervals for both setup slack and hold slack, and performing simulation by using a transistor-level simulation tool to respectively obtain the N clock terminal-to-output terminal delays of the register, where in this case, the obtained each group of simulation data includes a total of seven parameters including the input terminal transition time, the clock terminal transition time, the output load capacitance, the setup slack, the hold slack, the output terminal state, and the clock terminal-to-output terminal delay;

step 2.2. giving that a threshold of the clock terminal-to-output terminal delay is $M_{th} \times T_{cq}^{min}$, where $M_{th}$ is a delay threshold coefficient, and $1 \leq M_{th} \leq 10$; and eliminating these corresponding groups of simulation data when transistor-level simulation fails and the clock terminal-to-output terminal delay is greater than $M_{th} \times T_{cq}^{min}$, storing data obtained after elimination as training and test samples of a neural network model, and repeating the foregoing process under each different combination of $S_Q$, $T_{di}$, $T_{ckj}$, and $C_{Lk}$; and step 2.3. subsequently combining all simulation data under all combinations of the output terminal state $S_Q$, the input terminal transition time $T_{di}$, the clock terminal transition time $T_{ckj}$, and the output load capacitance $C_{Lk}$ of the register together to obtain the $N_s$ groups of model training sample data, where each group of training sample data includes the total of seven parameters including the input terminal transition time, the clock terminal transition time, the output load capacitance, the setup slack, the hold slack, the output terminal state, and the clock terminal-to-output terminal delay of the register.

Further, specific steps of the binary search in step 1.3 are as follows: an interval in which the search is started is $[T_{su}^C, T_{su}^A]$, simulation is performed at a middle position $(T_{su}^C + T_{su}^A)/2$ of the search interval to obtain the clock terminal-to-output terminal delay, and if in this case, the clock terminal-to-output terminal delay is $B_{cq} \times T_{cq}^{min}$, the search process ends; if in this case, the clock terminal-to-output terminal delay is greater than $B_{cq} \times T_{cq}^{min}$, the search interval is updated to $[(T_{su}^C + T_{su}^A)/2, T_{su}^A]$; if in this case, the clock terminal-to-output terminal delay is less than $B_{cq} \times T_{cq}^{min}$, the search interval is updated to $[T_{su}^C, (T_{su}^C + T_{su}^A)/2]$; then the foregoing process is repeated with the new search interval, the search interval is halved each time, and the search ends when a clock terminal-to-output terminal delay obtained through simulation by using the transistor-level simulation tool at a middle position in a search process is $B_{cq} \times T_{cq}^{min}$; and when a middle position of the last binary search interval, that is, the clock terminal-to-output terminal delay, is $B_{cq} \times T_{cq}^{min}$, the corresponding setup slack is denoted as $T_{su}^B$.

Further, specific steps of the binary search in step 1.5 are as follows: an interval in which the search is started is $[T_{hd}^G,$ $T_{hd}{}^A$], simulation is performed at a middle position ($T_{hd}{}^G$+ $T_{hd}{}^A$)/2 of the search interval to obtain the clock terminal-to-output terminal delay, and if in this case, the clock terminal-to-output terminal delay is $F_{cq} \times T_{cq}{}^{min}$, the search process ends; if in this case, the clock terminal-to-output terminal delay is greater than $F_{cq} \times T_{cq}{}^{min}$, the search interval is updated to [($T_{hd}{}^G$+$T_{hd}{}^A$)/2, $T_{hd}{}^A$]; if in this case, the clock terminal-to-output terminal delay is less than $F_{cq} \times T_{cq}{}^{min}$, the search interval is updated to [$T_{hd}{}^G$, ($T_{hd}{}^G$+$T_{hd}{}^A$)/2]; then the foregoing process is repeated with the new search interval, the search interval is halved each time, and the search ends when a clock terminal-to-output terminal delay obtained through simulation by using the transistor-level simulation tool at a middle position in a search process is $F_{cq} \times T_{cq}{}^{min}$; and when a middle position of the last binary search interval, that is, the clock terminal-to-output terminal delay, is $F_{cq} \times T_{cq}{}^{min}$, the corresponding hold slack is denoted as $T_{hd}{}^F$.

Further, specific steps of the binary search in step 1.6 are as follows: an interval in which the search is started is [$T_{hd}{}^F$, $T_{hd}{}^A$], simulation is performed at a middle position ($T_{hd}{}^F$+ $T_{hd}{}^A$)/2 of the search interval to obtain the clock terminal-to-output terminal delay, and if in this case, the clock terminal-to-output terminal delay is $D_{cq} \times T_{cq}{}^{min}$, the search process ends; if in this case, the clock terminal-to-output terminal delay is greater than $D_{cq} \times T_{cq}{}^{min}$, the search interval is updated to [($T_{hd}{}^F$+$T_{hd}{}^A$)/2, $T_{hd}{}^A$]; if in this case, the clock terminal-to-output terminal delay is less than $D_{cq} \times T_{cq}{}^{min}$, the search interval is updated to [$T_{hd}{}^F$, ($T_{hd}{}^F$+$T_{hd}{}^A$)/2]; then the foregoing process is repeated with the new search interval, and each time the search interval is halved, and the search ends when a clock terminal-to-output terminal delay obtained through simulation by using the transistor-level simulation tool at a middle position in a search process is $D_{cq} \times T_{cq}{}^{min}$; and when a middle position of the last binary search interval, that is, the clock terminal-to-output terminal delay, is $D_{cq} \times T_{cq}{}^{min}$, the corresponding hold slack is denoted as $T_{hd}{}^D$.

Further, specific steps of the binary search in step 1.7 are as follows: an interval in which the search is started is [$T_{su}{}^B$, $T_{su}{}^A$], simulation is performed at a middle position ($T_{su}{}^B$+ $T_{su}{}^A$)/2 of the search interval to obtain the clock terminal-to-output terminal delay, and if in this case, the clock terminal-to-output terminal delay is $H_{cq} \times T_{cq}{}^{min}$, the search process ends; if in this case, the clock terminal-to-output terminal delay is greater than $H_{cq} \times T_{cq}{}^{min}$, the search interval is updated to [($T_{su}{}^B$+$T_{su}{}^A$)/2, $T_{su}{}^A$]; if in this case, the clock terminal-to-output terminal delay is less than $H_{cq} \times T_{cq}{}^{min}$, the search interval is updated to [$T_{su}{}^B$, ($T_{su}{}^B$+$T_{su}{}^A$)/2]; then the foregoing process is repeated with the new search interval, and each time the search interval is halved, and the search ends when a clock terminal-to-output terminal delay obtained through simulation by using the transistor-level simulation tool at a middle position in a search process is $H_{cq} \times T_{cq}{}^{min}$; and when a middle position of the last binary search interval, that is, the clock terminal-to-output terminal delay, is $H_{cq} \times T_{cq}{}^{min}$, the corresponding setup slack is denoted as $T_{su}{}^H$.

A flexible modeling method for a timing constraint of a register of the present invention has the following advantages:

1. In a timing model of a register established in the present invention, a clock terminal-to-output terminal delay is modeled as a function of an input terminal transition time, a clock terminal transition time, an output load capacitance, setup slack, hold slack, and an output terminal state. A clock terminal-to-output terminal delay in a conventional timing constraint model of a register is a function of a clock terminal transition time, an output load capacitance, and an output terminal state. The register timing model established in the present invention can effectively represent correlation between setup slack, hold slack, and clock terminal-to-output terminal delay of a register, and takes the impact of an input terminal transition time on the clock terminal-to-output terminal delay into consideration, thereby describing a timing constraint of the register more comprehensively, overcoming the underestimation tendency of a conventional timing constraint model of the register, and helping to improve the precision of static timing analysis.

2. In the present invention, a simulation range of a flexible timing constraint model of a register keeps being reduced through a plurality of times of binary search, to effectively reduce simulation in a stable region, and avoid simulation in a metastable region, thereby effectively reducing simulation overheads, mitigating the problem of increased simulation overheads caused by flexible modeling of a timing constraint of a register, and benefiting the actual application of the modeling method to a static timing analysis procedure.

DETAILED DESCRIPTION

Figure 1:
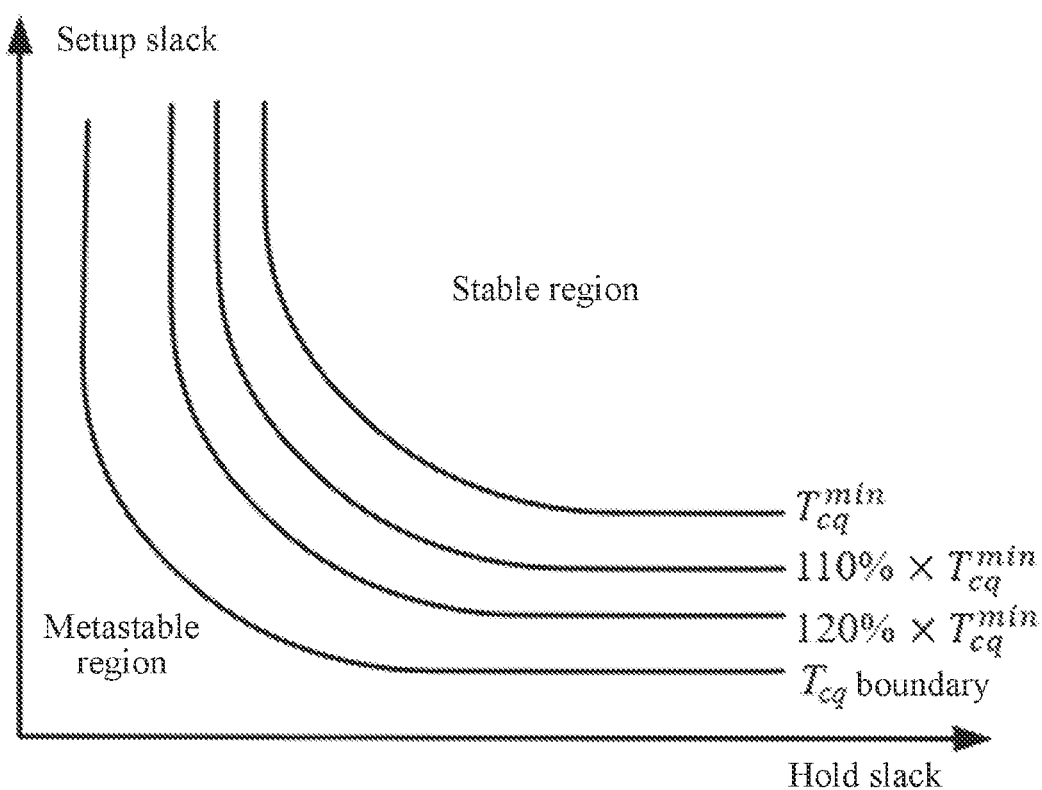
FIG. 1 is a diagram of a mutually independent relationship between setup slack, hold slack, and a clock terminal-to-output terminal delay of a register in the prior art.

For better understanding of the objective, structure, and function of the present invention, a flexible modeling method for a timing constraint of a register of the present invention is further described below in detail with reference to the accompanying drawings.

A flexible modeling method for a timing constraint of a register of the present invention includes the following steps:

Step 1. Perform simulation in a case of each combination of $S_Q$, $T_{di}$, $T_{ckj}$, and $C_{Lk}$ respectively to obtain a timing constraint range for establishing a model, the timing constraint range being a polygon DHIJKE shown in FIG. 2, where $S_Q$ represents an output terminal state of a register; $T_{di}$ represents p types of input terminal transition time $T_d$ of the register, i is an integer, and $1 \leq i \leq p$; $T_{ckj}$ represents q types of clock terminal transition time $T_{ck}$ of the register, j is an integer, and $1 \leq j \leq q$; and $C_{Lk}$ represents m types of output load capacitance $C_L$ of the register, k is an integer, and $1 \leq k \leq m$.

In a conventional timing constraint model of a register, it is assumed that a register operates in a region (that is, a stable region) with a constant register delay, that is, a clock terminal-to-output terminal delay $T_{cq}$. An assumed operating point of the register is obtained when the setup slack or the hold slack is sufficiently large. In this case, a corresponding clock terminal-to-output terminal delay is minimum $T_{cq}$ of the register when the setup slack and the hold slack are changed, and is denoted as $T_{cq}{}^{min}$. In addition, when the hold slack is set to a sufficiently large value, the setup slack is gradually reduced. Generally, the setup slack when $T_{cq}$ just reaches $110\% \times T_{cq}{}^{min}$ is set as the setup time, corresponding to setup slack at a point L in FIG. 2. Similarly, when the setup slack is set to a sufficiently large value, the hold slack is gradually reduced. Generally, the hold slack when $T_{cq}$ just reaches $110\% \times T_{cq}^{min}$ is set as the hold time, corresponding to hold slack at a point O in FIG. 2.

Step 1 specifically includes the following steps:

Step 1.1. Under each combination of $S_Q$, $T_{di}$, $T_{ckj}$, and $C_{Lk}$, perform simulation by using the transistor-level simulation tool first to obtain clock terminal-to-output terminal delays $T_{cq}$ when the setup slack has a sufficiently large value $T_{su}(\max)$ and the hold slack has a sufficiently large value $T_{hd}(\max)$, where the sufficiently large value of the setup slack refers to that in this case, if $T_{su}$ continues to increase, $T_{cq}$ no longer continues to decrease, and the sufficiently large value of the hold slack refers to that in this case, if $T_{hd}$ continues to increase, $T_{cq}$ no longer continues to decrease, specifically, when the setup slack increases from $T_{su}(\max)$ to $\delta_{su} \times T_{su}(\max)$ and the hold slack increases from $T_{hd}(\max)$ to $\delta_{hd} \times T_{hd}(\max)$, $T_{cq}$ remains unchanged, where $\delta_{su}$ is a setup slack verification coefficient, $1 \leq \delta_{su} \leq 1.1$, $\delta_{hd}$ is a hold slack verification coefficient, $1 \leq \delta_{hd} \leq 1.1$, and in this case, the register operates in a stable region, and it is denoted in this case that $T_{cq}$ is $T_{cq}^{min}$, the hold slack is $T_{hd}^{A}$, and the setup slack is $T_{su}^{A}$, corresponding to a point A shown in FIG. 2.

Step 1.2. Gradually reduce the setup slack with $T_{hd}^{A}$ as a fixed hold slack, where setup slack obtained when transistor-level simulation fails is minimum setup slack in the timing constraint range, and it is denoted in this case that the setup slack is $T_{su}^{C}$, corresponding to a point C shown in FIG. 2.

Step 1.3. Search for the value of the setup slack by using a binary method with $T_{hd}^{A}$ as a fixed hold slack, where an interval in which the search is started is $[T_{su}^{C}, T_{su}^{A}]$, performing simulation on the specific setup slack by using the transistor-level simulation tool to obtain $T_{cq}$, and setting a target value of $T_{cq}$ to $B_{cq} \times T_{cq}^{min}$, where $B_{cq}$ is a first target coefficient of the setup slack, $1 \leq B_{cq} \leq 1.1$, and the value of the setup slack found through binary search is denoted as $T_{su}^{B}$, corresponding to a point B shown in FIG. 2. Specific steps of the binary search are as follows: an interval in which the search is started is $[T_{su}^{C}, T_{su}^{A}]$, simulation is performed at a middle position $(T_{su}^{C}+T_{su}^{A})/2$ of the search interval to obtain the clock terminal-to-output terminal delay, and if in this case, the clock terminal-to-output terminal delay is $B_{cq} \times T_{cq}^{min}$, the search process ends; if in this case, the clock terminal-to-output terminal delay is greater than $B_{cq} \times T_{cq}^{min}$, the search interval is updated to $[(T_{su}^{C}+T_{su}^{A})/2, T_{su}^{A}]$; if in this case, the clock terminal-to-output terminal delay is less than $B_{cq} \times T_{cq}^{min}$, the search interval is updated to $[T_{su}^{C}, (T_{su}^{C}+T_{su}^{A})/2]$; then the foregoing process is repeated with the new search interval, the search interval is halved each time, and the search ends when a clock terminal-to-output terminal delay obtained through simulation by using the transistor-level simulation tool at a middle position in a search process is $B_{cq} \times T_{cq}^{min}$; and when a middle position of the last binary search interval, that is, the clock terminal-to-output terminal delay, is $B_{cq} \times T_{cq}^{min}$, the corresponding setup slack is denoted as $T_{su}^{B}$, corresponding to the point B shown in FIG. 2.

Step 1.4. Gradually reduce the hold slack with $T_{su}^{A}$ as a fixed setup slack, where hold slack obtained when transistor-level simulation fails is minimum hold slack in the timing constraint range, and it is recorded in this case that the hold slack is $T_{hd}^{G}$, corresponding to a point G shown in FIG. 2.

Step 1.5. Search for the value of the hold slack by using a binary method with $T_{su}^{A}$ as a fixed setup slack, where an interval in which the search is started is $[T_{hd}^{G}, T_{hd}^{A}]$, perform simulation on the specific hold slack by using the transistor-level simulation tool to obtain the clock terminal-to-output terminal delay $T_{cq}$, and set a target value of the clock terminal-to-output terminal delay $T_{cq}$ to $F_{cq} \times T_{cq}^{min}$, where $F_{cq}$ is a first target coefficient of the hold slack, $1 \leq F_{cq} \leq 1.1$, and the value of the hold slack found through binary search is denoted as $T_{hd}^{F}$, corresponding to a point F shown in FIG. 2. Specific steps of the binary search are as follows: an interval in which the search is started is $[T_{hd}^{G}, T_{hd}^{A}]$, simulation is performed at a middle position $(T_{hd}^{G}+T_{hd}^{A})/2$ of the search interval to obtain the clock terminal-to-output terminal delay, and if in this case, the clock terminal-to-output terminal delay is $F_{cq} \times T_{cq}^{min}$, the search process ends; if in this case, the clock terminal-to-output terminal delay is greater than $F_{cq} \times T_{cq}^{min}$, the search interval is updated to $[(T_{hd}^{G}+T_{hd}^{A})/2, T_{hd}^{A}]$; if in this case, the clock terminal-to-output terminal delay is less than $F_{cq} \times T_{cq}^{min}$, the search interval is updated to $[T_{hd}^{G}, (T_{hd}^{G}+T_{hd}^{A})/2]$; then the foregoing process is repeated with the new search interval, the search interval is halved each time, and the search ends when a clock terminal-to-output terminal delay obtained through simulation by using the transistor-level simulation tool at a middle position in a search process is $F_{cq} \times T_{cq}^{min}$; and when a middle position of the last binary search interval, that is, the clock terminal-to-output terminal delay, is $F_{cq} \times T_{cq}^{min}$, the corresponding hold slack is denoted as $T_{hd}^{F}$, corresponding to the point F shown in FIG. 2.

Step 1.6. Search for the value of the hold slack by using a binary method with $T_{su}^{B}$ as a fixed setup slack, where an interval in which the search is started is $[T_{hd}^{F}, T_{hd}^{A}]$, perform simulation on the specific hold slack by using the transistor-level simulation tool to obtain the clock terminal-to-output terminal delay $T_{cq}$, and set the target value of the clock terminal-to-output terminal delay $T_{cq}$ to $D_{cq} \times T_{cq}^{min}$, where $D_{cq}$ is a second target coefficient of the hold slack, $B_{cq} \leq D_{cq} \leq 1.1$, and the value of the hold slack found through binary search is denoted as $T_{hd}^{D}$, corresponding to a point D shown in FIG. 2. Specific steps of the binary search are as follows: an interval in which the search is started is $[T_{hd}^{F}, T_{hd}^{A}]$, simulation is performed at a middle position $(T_{hd}^{F}+T_{hd}^{A})/2$ of the search interval to obtain the clock terminal-to-output terminal delay, and if in this case, the clock terminal-to-output terminal delay is $D_{cq} \times T_{cq}^{min}$, the search process ends; if in this case, the clock terminal-to-output terminal delay is greater than $D_{cq} \times T_{cq}^{min}$, the search interval is updated to $[(T_{hd}^{F}+T_{hd}^{A})/2, T_{hd}^{A}]$; if in this case, the clock terminal-to-output terminal delay is less than $D_{cq} \times T_{cq}^{min}$, the search interval is updated to $[T_{dd}^{F}, (T_{hd}^{F}+T_{hd}^{A})/2]$; then the foregoing process is repeated with the new search interval, and each time the search interval is halved, and the search ends when a clock terminal-to-output terminal delay obtained through simulation by using the transistor-level simulation tool at a middle position in a search process is $D_{cq} \times T_{cq}^{min}$; and when a middle position of the last binary search interval, that is, the clock terminal-to-output terminal delay, is $D_{cq} \times T_{cq}^{min}$, the corresponding hold slack is denoted as $T_{hd}^{D}$, corresponding to the point D shown in FIG. 2.

Step 1.7. Search for the value of the setup slack by using a binary method with $T_{hd}^{F}$ as a fixed hold slack, where an interval in which the search is started is $[T_{su}^{B}, T_{su}^{A}]$, performing simulation on the specific setup slack by using the transistor-level simulation tool to obtain the clock terminal-to-output terminal delay $T_{cq}$, and setting the target value of the clock terminal-to-output terminal delay $T_{cq}$ to $H_{cq} \times T_{cq}^{min}$, where $H_{cq}$, is a second target coefficient of the setup slack, $F_{cq} \leq H_{cq} \leq 1.1$, and the value of the setup slack found through binary search is denoted as $T_{su}^{H}$, corresponding to a point H shown in FIG. 2. Specific steps of the binary search are as follows: an interval in which the search is started is $[T_{su}^B, T_{su}^A]$, simulation is performed at a middle position $(T_{su}^B+T_{su}^A)/2$ of the search interval to obtain the clock terminal-to-output terminal delay, and if in this case, the clock terminal-to-output terminal delay is $H_{cq} \times T_{cq}^{min}$, the search process ends; if in this case, the clock terminal-to-output terminal delay is greater than $H_{cq} \times T_{cq}^{min}$, the search interval is updated to $[(T_{su}^B+T_{su}^A)/2, T_{su}^A]$; if in this case, the clock terminal-to-output terminal delay is less than $H_{cg} \times T_{cq}^{min}$, the search interval is updated to $[T_{su}^B, (T_{su}^B+T_{su}^A)/2]$; then the foregoing process is repeated with the new search interval, and each time the search interval is halved, and the search ends when a clock terminal-to-output terminal delay obtained through simulation by using the transistor-level simulation tool at a middle position in a search process is $H_{cq} \times T_{cq}^{min}$; and when a middle position of the last binary search interval, that is, the clock terminal-to-output terminal delay, is $H_{cq} \times T_{cq}^{min}$, the corresponding setup slack is denoted as $T_{su}^H$, corresponding to the point H shown in FIG. 2.

Figure 2:
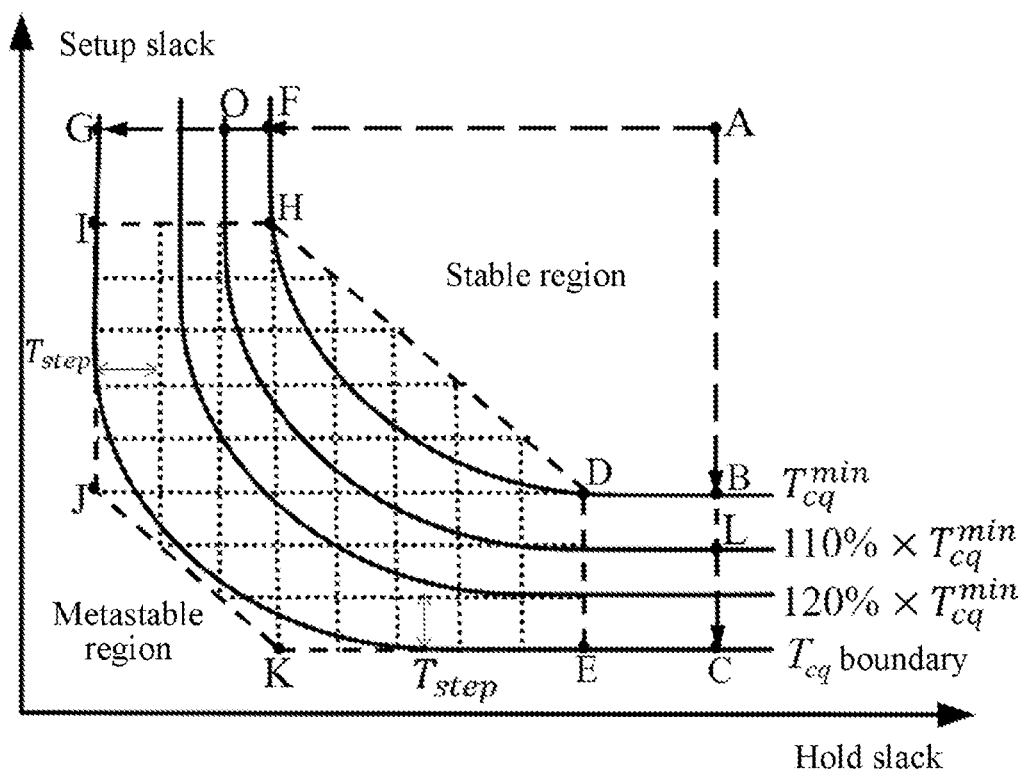
FIG. 2 is a schematic diagram of a simulation range required for a register flexible timing constraint model according to the present invention.

Step 1.8. Form a constraint condition by using the following formulas for a simulation range of the pair of the hold slack $T_{hd}$ and the setup slack $T_{su}$ under the combination of $S_Q$, $T_{di}$, $T_{cjk}$, and $C_{Lk}$:

$$\begin{cases} T_{hd}^G \leq T_{hd} \leq T_{hd}^D \\ T_{su}^C \leq T_{su} \leq T_{su}^H \\ \dfrac{T_{su} - T_{su}^H}{T_{su}^B - T_{su}^H} \leq \dfrac{T_{hd} - T_{hd}^F}{T_{hd}^D - T_{hd}^F}, \\ \dfrac{T_{hd} - T_{hd}^G}{T_{hd}^F - T_{hd}^G} \leq \dfrac{T_{su} - T_{su}^B}{T_{su}^C - T_{su}^B} \end{cases} \quad (1)$$

the foregoing formula is the timing constraint range of the model established in a case of the combination of $S_Q$, $T_{di}$, $T_{ckj}$, and $C_{Lk}$, that is, a region of the polygon DHIJKE shown in FIG. 2.

Step 2. Under the obtained timing constraint range under each combination of $S_Q$, $T_{di}$, $T_{ckj}$, and $C_{Lk}$, set that $T_{step}$ is a sampling interval of both setup slack and hold slack, extract N combination pairs of setup slack and hold slack with the set $T_{step}$ as intervals for both setup slack and hold slack, where as shown in FIG. 2, the combination pairs of setup slack and hold slack are combinations of setup slack and hold slack corresponding to N intersections of transverse dotted lines and vertical dotted lines in the polygon DHIJKE shown in FIG. 2, perform simulation by using a transistor-level simulation tool to respectively obtain N clock terminal-to-output terminal delays of the register, and subsequently combining all simulation data under all combinations of $S_Q$, $T_{di}$, $T_{ckj}$, and $C_{Lk}$ together to obtain $N_s$ groups of model training sample data, where each group of training sample data includes parameters including the input terminal transition time, the clock terminal transition time, the output load capacitance, the setup slack, the hold slack, the output terminal state, and the clock terminal-to-output terminal delay of the register.

Step 2 specifically includes the following steps:

Step 2.1. Set that $T_{step}$ is the sampling interval of both setup slack and hold slack, as shown in FIG. 2, extract the N combination pairs of setup slack and hold slack with the set $T_{step}$ as intervals for both setup slack and hold slack, and perform simulation by using a transistor-level simulation tool to respectively obtain the N clock terminal-to-output terminal delays of the register, where in this case, the obtained each group of simulation data includes a total of seven parameters including the input terminal transition time, the clock terminal transition time, the output load capacitance, the setup slack, the hold slack, the output terminal state, and the clock terminal-to-output terminal delay.

Step 2.2. Give that a threshold of the clock terminal-to-output terminal delay is $M_{th} \times T_{cq}^{min}$, where $M_{th}$ is a delay threshold coefficient, and $1 \leq M_{th} \leq 10$; and eliminate these corresponding groups of simulation data when transistor-level simulation fails and the clock terminal-to-output terminal delay is greater than $M_{th} \times T_{cq}^{min}$, store data obtained after elimination as training and test samples of a neural network model, and repeat the foregoing process under each different combination of $S_Q$, $T_{di}$, $T_{ckj}$, and $C_{Lk}$.

Step 2.3. Subsequently combine all simulation data under all combinations of the output terminal state $S_Q$, the input terminal transition time $T_{di}$, the clock terminal transition time $T_{ckj}$, and the output load capacitance $C_{Lk}$ of the register together to obtain the $N_s$ groups of model training sample data, where each group of training sample data includes the total of seven parameters including the input terminal transition time, the clock terminal transition time, the output load capacitance, the setup slack, the hold slack, the output terminal state, and the clock terminal-to-output terminal delay of the register.

Figure 3:
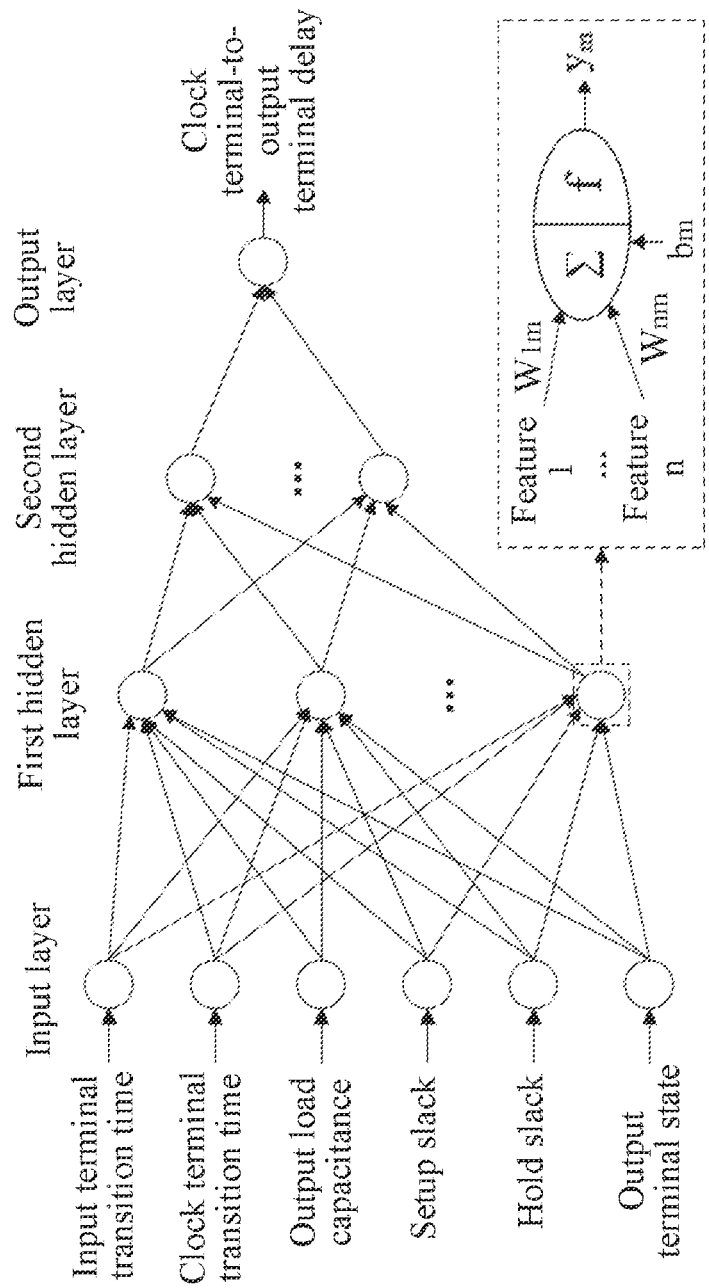
FIG. 3 is a schematic structural diagram of a neural network model for obtaining a register clock terminal-to-output terminal delay $T_{cq}$ through inference according to the present invention.

Step 3. Use the input terminal transition time, the clock terminal transition time, the output load capacitance, the setup slack, the hold slack, and the output terminal state of the register as model features, use the corresponding clock terminal-to-output terminal delays of the register obtained in step 2 as model labels, perform training by using a neural network, and establish a mutually independent timing model of the register. The structure of the neural network model is shown in FIG. 3. Parameters of an input layer of a neural network includes the input terminal transition time, the clock terminal transition time, the output load capacitance, the setup slack, the hold slack, and the output terminal state of the register. The neural network in FIG. 3 includes two hidden layers (in fact, a quantity of hidden layers and a quantity of neurons in each hidden layer may be adjusted according to a specific case). An output layer is the register clock terminal-to-output terminal delay.

Step 4. Obtain timing constraints by using a static timing analysis tool, the timing constraints including the output terminal state, the input terminal transition time, the clock terminal transition time, and the output load capacitance of the register, and perform inference by using the mutually independent timing model of the register obtained in step 3 to obtain a clock terminal-to-output terminal delay of the register when the setup slack is $T_{su}^t$ and a clock terminal-to-output terminal delay of the register when the hold slack is $T_{hd}^t$. As shown in FIG. 3, the input terminal transition time, the clock terminal transition time, the output load capacitance, the setup slack, the hold slack, and the output terminal state of the register are used as inputs of the neural network model, and the clock terminal-to-output terminal delay is calculated and outputted by using the neural network.

It may be understood that the present invention is described by using a number of embodiments. It is known to those skilled in the art that various changes or equivalent substitutions can be made to these features and embodiments without departing from the spirit and scope of the present invention. Furthermore, under the teachings of the present invention, these features and embodiments can be modified to adapt to specific cases and materials without departing from the spirit and scope of the present invention. Accordingly, the present invention is not limited to the specific embodiments disclosed herein, and all embodiments falling within the scope of the claims of the present application fall within the scope protected by the present invention.

What is claimed is:

1. A flexible modeling method for a timing constraint of a register, including the following steps:

step 1. performing simulation in a case of each combination of $S_Q$, $T_{di}$, $T_{ckj}$, and $C_{Lk}$ respectively to obtain a timing constraint range for establishing a model, where $S_Q$ represents an output terminal state of a register; $T_{di}$ represents p types of input terminal transition time $T_d$ of the register, i is an integer, and $1 \leq i \leq p$; $T_{ckj}$ represents q types of clock terminal transition time $T_{ck}$ of the register, j is an integer, and $1 \leq j \leq q$; and $C_{Lk}$ represents m types of output load capacitance $C_L$ of the register, k is an integer, and $1 \leq k \leq m$;

step 2. under the obtained timing constraint range under each combination of $S_Q$, $T_{di}$, $T_{ckj}$, and $C_{LK}$, setting that $T_{step}$ is a sampling interval of both setup slack and hold slack, extracting N combination pairs of setup slack $T_{su}$ and hold slack $T_{hd}$ with the set $T_{step}$ as intervals for both setup slack and hold slack, performing simulation by using a transistor-level simulation tool to respectively obtain N clock terminal-to-output terminal delays of the register, and subsequently combining all simulation data of under all combinations of $S_Q$, $T_{di}$, $T_{ckj}$, and $C_{LK}$ together to obtain $N_s$ groups of model training sample data, where each group of training sample data includes parameters including the input terminal transition time, the clock terminal transition time, the output load capacitance, the setup slack, the hold slack, the output terminal state, and the clock terminal-to-output terminal delay of the register, where N is an integer which denotes the number of combinations for simulation with different $T_{su}$ and $T_{hd}$ under the same set of $S_Q$, $T_{di}$, $T_{ckj}$, and $C_{LK}$, $N_s$ is an integer which denotes the number of samples for model training with different $S_Q$, $T_{di}$, $T_{ckj}$, and $C_{Lk}$ as well as $T_{su}$ and $T_{hd}$ and $T_{su}$ and $T_{hd}$ denote the time of setup slack and hold slack respectively;

step 3. using the input terminal transition time, the clock terminal transition time, the output load capacitance, the setup slack, the hold slack, and the output terminal state of the register as model features, using the corresponding clock terminal-to-output terminal delays of the register obtained in step 2 as model labels, performing training by using a neural network, and establishing a mutually independent timing model of the register; and step 4. obtaining timing constraints by using a static timing analysis tool, the timing constraints including the output terminal state, the input terminal transition time, the clock terminal transition time, and the output load capacitance of the register, and performing inference by using the mutually independent timing model of the register obtained in step 3 to obtain a clock terminal-to-output terminal delay of the register when the setup slack is $T_{su}^t$ and a clock terminal-to-output terminal delay of the register when the hold slack is $T_{hd}^t$, wherein step 1 includes the following steps:

step 1.1. under each combination of $S_Q$, $T_{di}$, $T_{ckj}$, and $C_{LK}$, performing simulation by using the transistor-level simulation tool first to obtain clock terminal-to-output terminal delays $T_{cq}$ when the setup slack has a sufficiently large value $T_{su}(max)$ and the hold slack has a sufficiently large value $T_{hd}(max)$, where the sufficiently large value of the setup slack refers to that in this case, if $T_{su}$ continues to increase, $T_{cq}$ no longer continues to decrease, and the sufficiently large value of the hold slack refers to that in this case, if $T_{hd}$ continues to increase, $T_{cq}$ no longer continues to decrease, that is, when the setup slack increases from $T_{su}(max)$ to $\delta_{su} \times T_{su}(max)$ and the hold slack increases from $T_{hd}(max)$ to $\delta_{hd} \times T_{hd}(max)$, $T_{cq}$ remains unchanged, where $\delta_{su}$ is a setup slack verification coefficient, $1 \leq \delta_{su} \leq 1.1$, $\delta_{hd}$ is a hold slack verification coefficient, $1 \leq \delta_{hd} \leq 1.1$, and in this case, the register operates in a stable region, and it is denoted in this case that $T_{cq}$ is $T_{cq}^{min}$ in the hold slack is $T_{hd}^A$, and the setup slack is $T_{su}^A$;

step 1.2. gradually reducing the setup slack with $T_{hd}^A$ as a fixed hold slack, where setup slack obtained when transistor-level simulation fails is minimum setup slack in the timing constraint range, and it is denoted in this case that the setup slack is $T_{su}^C$;

step 1.3. searching for the value of the setup slack by using a binary method with $T_{hd}^A$ as a fixed hold slack, where an interval in which the search is started is $[T_{su}^C, T_{su}^A]$, performing simulation on the setup slack by using the transistor-level simulation tool to obtain $T_{cq}$, and setting a target value of $T_{cq}$ to $B_{cq} \times T_{cq}^{min}$, where $B_{cq}$ is a first target coefficient of the setup slack, $1 \leq B_{cq} \leq 1.1$, and the value of the setup slack found through binary search is denoted as $T_{su}^B$;

step 1.4. gradually reducing the hold slack with $T_{su}^A$ as a fixed setup slack, where hold slack obtained when transistor-level simulation fails is minimum hold slack in the timing constraint range, and it is recorded in this case that the hold slack is $T_{hd}^G$;

step 1.5. searching for the value of the hold slack by using a binary method with $T_{su}^A$ as a fixed setup slack, where an interval in which the search is started is $[T_{hd}^G, T_{hd}^A]$, performing simulation on the hold slack by using the transistor-level simulation tool to obtain the clock terminal-to-output terminal delay $T_{cq}$, and setting a target value of the clock terminal-to-output terminal delay $T_{cq}$ to $F_{cq} \times T_{cq}^{min}$ where $F_{cq}$ is a first target coefficient of the hold slack, $1 \leq F_{cq} \leq 1.1$, and the value of the hold slack found through binary search is denoted as $T_{hd}^F$; and step 1.6. searching for the value of the hold slack by using a binary method with $T_{su}^B$ as a fixed setup slack, where an interval in which the search is started is $[T_{hd}^F, T_{hd}^A]$, performing simulation on the hold slack by using the transistor-level simulation tool to obtain the clock terminal-to-output terminal delay $T_{cq}$, and setting the target value of the clock terminal-to-output terminal delay $T_{cq}$ to $D_{cq} \times T_{cq}^{min}$, where $D_{cq}$ is a second target coefficient of the hold slack, $B_{cq} \leq D_{cq} \leq 1.1$, and the value of the hold slack found through binary search is denoted as $T_{hd}^D$;

step 1.7. searching for the value of the setup slack by using a binary method with $T_{hd}^F$ as a fixed hold slack, where an interval in which the search is started is $[T_{su}^B, T_{su}^A]$, performing simulation on the setup slack by using the transistor-level simulation tool to obtain the clock terminal-to-output terminal delay $T_{cq}$, and setting the target value of the clock terminal-to-output terminal delay $T_{cq}$ to $H_{cq} \times T_{cq}^{min}$, where $H_{cq}$ is a second target coefficient of the setup slack, $F_{cq} \leq H_{cq} \leq 1.1$, and the value of the setup slack found through binary search is denoted as $T_{su}^H$;

step 1.8. forming a constraint condition by using the following formulas for a simulation range of the pair of the hold slack $T_{hd}$ and the setup slack $T_{su}$ under the combination of $S_Q$, $T_{di}$, $T_{ckj}$, and $C_{LK}$;

$$\begin{cases} T_{hd}^G \leq T_{hd} \leq T_{hd}^D \\ T_{su}^C \leq T_{su} \leq T_{su}^H \\ \dfrac{T_{su} - T_{su}^H}{T_{su}^B - T_{su}^H} \leq \dfrac{T_{hd} - T_{hd}^F}{T_{hd}^D - T_{hd}^F}, \\ \dfrac{T_{hd} - T_{hd}^G}{T_{hd}^F - T_{hd}^G} \leq \dfrac{T_{su} - T_{su}^B}{T_{su}^C - T_{su}^B} \end{cases} \quad (1)$$

the foregoing formula is the timing constraint range of the model established in a case of the combination of $S_Q$, $T_{di}$, $T_{ckj}$, and $C_{Lk}$.

2. The flexible modeling method for a timing constraint of a register according to claim 1, where step 2 specifically includes the following steps:

step 2.1. setting that $T_{step}$ is the sampling interval of both setup slack and hold slack, extracting the N combination pairs of setup slack and hold slack with the set $T_{step}$ as intervals for both setup slack and hold slack, and performing simulation by using a transistor-level simulation tool to respectively obtain the N clock terminal-to-output terminal delays of the register, where in this case, the obtained each group of simulation data includes a total of seven parameters including the input terminal transition time, the clock terminal transition time, the output load capacitance, the setup slack, the hold slack, the output terminal state, and the clock terminal-to-output terminal delay;

step 2.2. giving that a threshold of the clock terminal-to-output terminal delay is $M_{th} \times T_{cq}^{min}$, where $M_{th}$ is a delay threshold coefficient, and $1 \leq M_{th} \leq 10$; and eliminating these corresponding groups of simulation data when transistor-level simulation fails and the clock terminal-to-output terminal delay is greater than $M_{th} \times T_{cq}^{min}$, storing data obtained after elimination as training and test samples of a neural network model, and repeating the foregoing process under each different combination of $S_Q$, $T_{di}$, $T_{ckj}$, and $C_{LK}$; and step 2.3. subsequently combining all simulation data under all combinations of the output terminal state $S_Q$, the input terminal transition time $T_{di}$, the clock terminal transition time $T_{ckj}$, and the output load capacitance $C_{LK}$ of the register together to obtain the $N_s$ groups of model training sample data, where each group of training sample data includes the total of seven parameters including the input terminal transition time, the clock terminal transition time, the output load capacitance, the setup slack, the hold slack, the output terminal state, and the clock terminal-to-output terminal delay of the register.

3. The flexible modeling method for a timing constraint of a register according to claim 1, where steps of the binary search in step 1.3 are as follows: the simulation is performed at a middle position $(T_{su}^C + T_{su}^A)/2$ of the search interval to obtain the clock terminal-to-output terminal delay, and if in this case, the clock terminal-to-output terminal delay is $B_{cq} \times T_{cq}^{min}$, the search process ends; if in this case, the clock terminal-to-output terminal delay is greater than $B_{cq} \times T_{cq}^{min}$, the search interval is updated to $[(T_{su}^C + T_{su}^A)/2, T_{su}^A]$; if in this case, the clock terminal-to-output terminal delay is less than $B_{cq} \times T_{cq}^{min}$, the search interval is updated to $[T_{su}^C, (T_{su}^C + T_{su}^A)/2]$; then the foregoing process is repeated with the new search interval, the search interval is halved each time, and the search ends when a clock terminal-to-output terminal delay obtained through simulation by using the transistor-level simulation tool at a middle position in a search process is $B_{cq} \times T_{cq}^{min}$; and when a middle position of the last binary search interval, that is, the clock terminal-to-output terminal delay, is $B_{cq} \times T_{cq}^{min}$, the corresponding setup slack is denoted as $T_{su}^B$.

4. The flexible modeling method for a timing constraint of a register according to claim 1, where steps of the binary search in step 1.5 are as follows: the simulation is performed at a middle position $(T_{hd}^G + T_{hd}^A)/2$ of the search interval to obtain the clock terminal-to-output terminal delay, and if in this case, the clock terminal-to-output terminal delay is $F_{cq} \times T_{cq}^{min}$, the search process ends; if in this case, the clock terminal-to-output terminal delay is greater than $F_{cq} \times T_{cq}^{min}$, the search interval is updated to $[(T_{hd}^G + T_{hd}^A)/2, T_{hd}^A]$; if in this case, the clock terminal-to-output terminal delay is less than $F_{cq} \times T_{cq}^{min}$, the search interval is updated to $[T_{hd}^G, (T_{hd}^G + T_{hd}^A)/2]$; then the foregoing process is repeated with the new search interval, the search interval is halved each time, and the search ends when a clock terminal-to-output terminal delay obtained through simulation by using the transistor-level simulation tool at a middle position in a search process is $F_{cq} \times T_{cq}^{min}$; and when a middle position of the last binary search interval, that is, the clock terminal-to-output terminal delay, is $F_{cq} \times T_{cq}^{min}$, the corresponding hold slack is denoted as $T_{hd}^F$.

5. The flexible modeling method for a timing constraint of a register according to claim 1, where steps of the binary search in step 1.6 are as follows: the simulation is performed at a middle position $(T_{hd}^F + T_{hd}^A)/2$ of the search interval to obtain the clock terminal-to-output terminal delay, and if in this case, the clock terminal-to-output terminal delay is $D_{cq} \times T_{cq}^{min}$, the search process ends; if in this case, the clock terminal-to-output terminal delay is greater than $D_{cq} \times T_{cq}^{min}$, the search interval is updated to $[(T_{hd}^F + T_{hd}^A)/2, T_{hd}^A]$; if in this case, the clock terminal-to-output terminal delay is less than $D_{cq} \times T_{cq}^{min}$, the search interval is updated to $[(T_{hd}^F, T_{hd}^F + T_{hd}^A)/2]$; then the foregoing process is repeated with the new search interval, and each time the search interval is halved, and the search ends when a clock terminal-to-output terminal delay obtained through simulation by using the transistor-level simulation tool at a middle position in a search process is $D_{cq} \times T_{cq}^{min}$; and when a middle position of the last binary search interval, that is, the clock terminal-to-output terminal delay, is $D_{cq} \times T_{cq}^{min}$, the corresponding hold slack is denoted as $T_{hd}^D$.

6. The flexible modeling method for a timing constraint of a register according to claim 1, where steps of the binary search in step 1.7 are as follows: the simulation is performed at a middle position $(T_{su}^B + T_{su}^A)/2$, of the search interval to obtain the clock terminal-to-output terminal delay, and if in this case, the clock terminal-to-output terminal delay is $H_{cq} \times T_{cq}^{min}$, the search process ends; if in this case, the clock terminal-to-output terminal delay is greater than $H_{cq} \times T_{cq}^{min}$, the search interval is updated to $[(T_{su}^B + T_{su}^A)/2, T_{su}^A]$; if in this case, the clock terminal-to-output terminal delay is less than $H_{cq} \times T_{cq}^{min}$, the search interval is updated to $[T_{su}^B, (T_{su}^B + T_{su}^A)/2]$; then the foregoing process is repeated with the new search interval, and each time the search interval is halved, and the search ends when a clock terminal-to-output terminal delay obtained through simulation by using the transistor-level simulation tool at a middle position in a search process is $H_{cq} \times T_{cq}^{min}$; and when a middle position of the last binary search interval, that is, the clock terminalto-output terminal delay, is $H_{cq} \times T_{cq}^{min}$, the corresponding setup slack is denoted as $T_{su}^{H}$.

* * * * *